United States Patent
Lica et al.

(10) Patent No.: US 10,431,788 B2
(45) Date of Patent: Oct. 1, 2019

(54) HOLDING-DOWN MEANS FOR FIXING BATTERY CELLS IN A BATTERY SUBMODULE, AND BATTERY SUBMODULE

(71) Applicant: Robert Bosch GmbH, Stuttgart (DE)

(72) Inventors: Ionut Marian Lica, Schwieberdingen (DE); Ralf Oswald, Grafenau (DE); Seyed Mohammad Seyed Abbassi, Pforzheim (DE); Simon Obergfaell, Waiblingen (DE); Thomas Klemen, Ilsfeld/Auenstein (DE); Michael Riefler, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/739,834

(22) PCT Filed: May 24, 2016

(86) PCT No.: PCT/EP2016/061644
§ 371 (c)(1),
(2) Date: Dec. 26, 2017

(87) PCT Pub. No.: WO2017/001119
PCT Pub. Date: Jan. 5, 2017

(65) Prior Publication Data
US 2018/0190956 A1  Jul. 5, 2018

(30) Foreign Application Priority Data

Jun. 30, 2015  (DE) .................. 10 2015 212 212

(51) Int. Cl.
*H01M 6/42* (2006.01)
*H01M 2/10* (2006.01)
(Continued)

(52) U.S. Cl.
CPC ......... *H01M 2/1077* (2013.01); *H01M 2/043* (2013.01); *H01M 2/12* (2013.01);
(Continued)

(58) Field of Classification Search
CPC ...... H01M 2/1077; H01M 2/043; H01M 2/12; H01M 2/1211; H01M 2/1241;
(Continued)

(56) References Cited

U.S. PATENT DOCUMENTS

2010/0215998 A1  8/2010  Byun et al.
2011/0262799 A1  10/2011  Kim
(Continued)

FOREIGN PATENT DOCUMENTS

DE  102011109249  2/2013
DE  102012217451  4/2014
(Continued)

OTHER PUBLICATIONS

International Search Report for Application No. PCT/EP2016/061644 dated Jul. 21, 2016 (English Translation, 3 pages).

*Primary Examiner* — Jane J Rhee
(74) *Attorney, Agent, or Firm* — Michael Best & Friedrich LLP

(57) ABSTRACT

The invention relates to a holding-down means (100) for fixing battery cells (2) in a battery submodule (70), comprising positioning elements for positioning the holding-down means (100) relative to the battery cells (2), and comprising guide elements for guiding cell connectors (80) which connect the battery cells (2), wherein gas-venting openings which pass through from a top side to a bottom side are provided in a central region of the holding-down means (100), and wherein the sealing elements which surround the gas-venting openings are provided on the bottom side of the holding-down means (100). The invention also
(Continued)

relates to a battery submodule (70) which comprises a plurality of battery cells (2) and cell connectors (80) which connect the battery cells (2), and also at least one holding-down means (100) for fixing the battery cells (2).

16 Claims, 7 Drawing Sheets

(51) Int. Cl.
| | | |
|---|---|---|
| *H01M 2/04* | (2006.01) | |
| *H01M 2/12* | (2006.01) | |
| *H01M 10/625* | (2014.01) | |
| *H01M 10/04* | (2006.01) | |
| *H01M 10/052* | (2010.01) | |
| *H01M 2/20* | (2006.01) | |

(52) U.S. Cl.
CPC ....... *H01M 2/1211* (2013.01); *H01M 2/1241* (2013.01); *H01M 10/0481* (2013.01); *H01M 10/0486* (2013.01); *H01M 10/052* (2013.01); *H01M 10/625* (2015.04); *H01M 2/206* (2013.01); *H01M 2220/20* (2013.01)

(58) Field of Classification Search
CPC ............. H01M 2/206; H01M 2220/20; H01M 10/625; H01M 10/0481; H01M 10/0486; H01M 10/052
See application file for complete search history.

(56) References Cited

U.S. PATENT DOCUMENTS

| | | |
|---|---|---|
| 2012/0177970 A1 | 7/2012 | Marchio et al. |
| 2012/0244397 A1 | 9/2012 | Tenhouten et al. |
| 2013/0236754 A1 | 9/2013 | Lim |
| 2014/0087217 A1 | 3/2014 | Zink et al. |
| 2014/0255750 A1 | 9/2014 | Jan et al. |
| 2014/0349152 A1 | 11/2014 | Guen |
| 2015/0162578 A1 | 6/2015 | Kim et al. |

FOREIGN PATENT DOCUMENTS

| | | |
|---|---|---|
| DE | 102013015785 | 3/2015 |
| EP | 2800165 | 11/2014 |

HOLDING-DOWN MEANS FOR FIXING BATTERY CELLS IN A BATTERY SUBMODULE, AND BATTERY SUBMODULE

BACKGROUND OF THE INVENTION

The invention relates to as holding-down means for fixing battery cells in a battery submodule and to a battery submodule which comprises a holding-down means according to the invention.

Electric energy can be stored by means of batteries. Batteries convert chemical reaction energy into electric energy. In so doing, primary batteries and secondary batteries are differentiated. Primary batteries are only functional once, whereas secondary batteries, which are also referred to as accumulators, can be recharged. A battery comprises in this case one or a plurality of battery cells.

So-called lithium-ion battery cells are particularly used in an accumulator. These are characterized among other things by high energy densities, thermal stability and an extremely low self-discharge. Lithium-ion batteries are used inter alia in motor vehicles, particularly in electric vehicles (EV), hybrid vehicles (hybrid electric vehicle, HEV) as well as in plug-in hybrid vehicles (plug-in hybrid electric vehicle, PHEV).

A generic battery cell is, for example, disclosed in the German patent application DE 10 2012 217 451 A1. The battery cell has a cell housing which is, for example, made from metal. The cell housing is designed prismatically, in particular cuboid-shaped, and formed in a pressure-resistant manner. The battery thus has a positive terminal and a negative terminal for electrical contacting.

A plurality of battery cells are consolidated to form a battery submodule and connected electrically to one another. To this end, the battery cells are arranged in a common housing or box, and the terminals of the battery cells are connected to one another by means of cell connectors. A plurality of battery submodules form a battery.

Holding-down means, which fix the battery cells in the submodule in their position, are known in order to prevent battery cells from moving relative to one another as a result of impacts, for example during transport. Such a movement could lead to the cell connectors tearing off.

A battery module having a plurality of battery cells is known from the American patent application US 2012/0244397 A1. The battery module comprises a latticed frame for receiving the battery cells and retaining straps for fixing the battery cells in the frame.

Furthermore, a battery module is known from the American patent application US 2012/0177970 A1, which has a plurality of battery cells that are arranged and fixed in a latticed frame.

A battery module having a plurality of battery cells, which are connected to one another by means of cell connectors, is likewise known from the American patent application US 2014/0255750 A1.

A battery cell with a metallic housing is disclosed in the American patent application US 2014/0349152 A1. The terminals of the battery cell are thereby insulated from the metallic housing by means of insulators.

SUMMARY OF THE INVENTION

A holding-down means for fixing battery cells in a battery submodule is proposed, which comprises positioning elements for positioning the holding-down means relative to the battery cells and guide elements for guiding cell connectors which connect the battery cells. As a result, individual battery cells are prevented from moving vertically relative to one another and cell connectors are prevented from tearing off.

According to the invention, gas-venting openings which pass through from a top side to a bottom side are provided in a central region of the holding-down means, wherein sealing elements which surround the gas-venting openings are provided on the bottom side of the holding-down means. When bearing against a battery cell, such a sealing element serves to laterally seal the gas-venting opening.

According to an advantageous modification to the invention, tolerance compensation elements are provided on the top side of the holding-down means. The tolerance compensation elements ensure a tolerance compensation between the battery cells and a further battery submodule arranged above said battery cells.

According to a further advantageous modification to the invention, cable guides for guiding electric cables are provided.

The guide elements are preferably designed as guide openings which pass through from the top side to the bottom side. The guide openings are used here to receive the cell connectors.

The guide elements advantageously comprise at least one first step to support the cell connector and a second step. Creepage distances between adjacent cell connectors are enlarged by means of the second step.

A battery submodule is also proposed which comprises a plurality of battery cells and cell connectors which connect the battery cells as well as at least one holding-down means according to the invention for fixing the battery cells.

The sealing elements of the holding-down means rest preferably on the battery cells.

The battery cells advantageously have bursting openings which are surrounded by the sealing elements of the holding-down means.

The cell connectors preferably engage in guide elements of the holding-down means.

A battery submodule according to the invention is advantageously used in an electric vehicle (EV), in a hybrid vehicle (HEV), in a plug-in hybrid vehicle (PHEV), in a stationary battery or in a battery in a marine application.

The holding-down means according to the invention allows for a casting of the battery cells within a submodule box of the battery submodule, without the bursting openings of the battery cells being wetted with casting compound. Hence, a discharge of gases escaping the battery cells through the gas-venting openings is possible throughout the process.

Creepage distances between adjacent cell connectors are enlarged by introducing the second step into the guide openings of the holding-down means. As a result, the danger of short circuits is reduced, in particular when condensation forms or water accumulates between the terminals.

BRIEF DESCRIPTION OF THE DRAWINGS

Embodiments of the invention are explained in greater detail using the drawings and the following description.

In the drawings.

DETAILED DESCRIPTION

Figure 1:
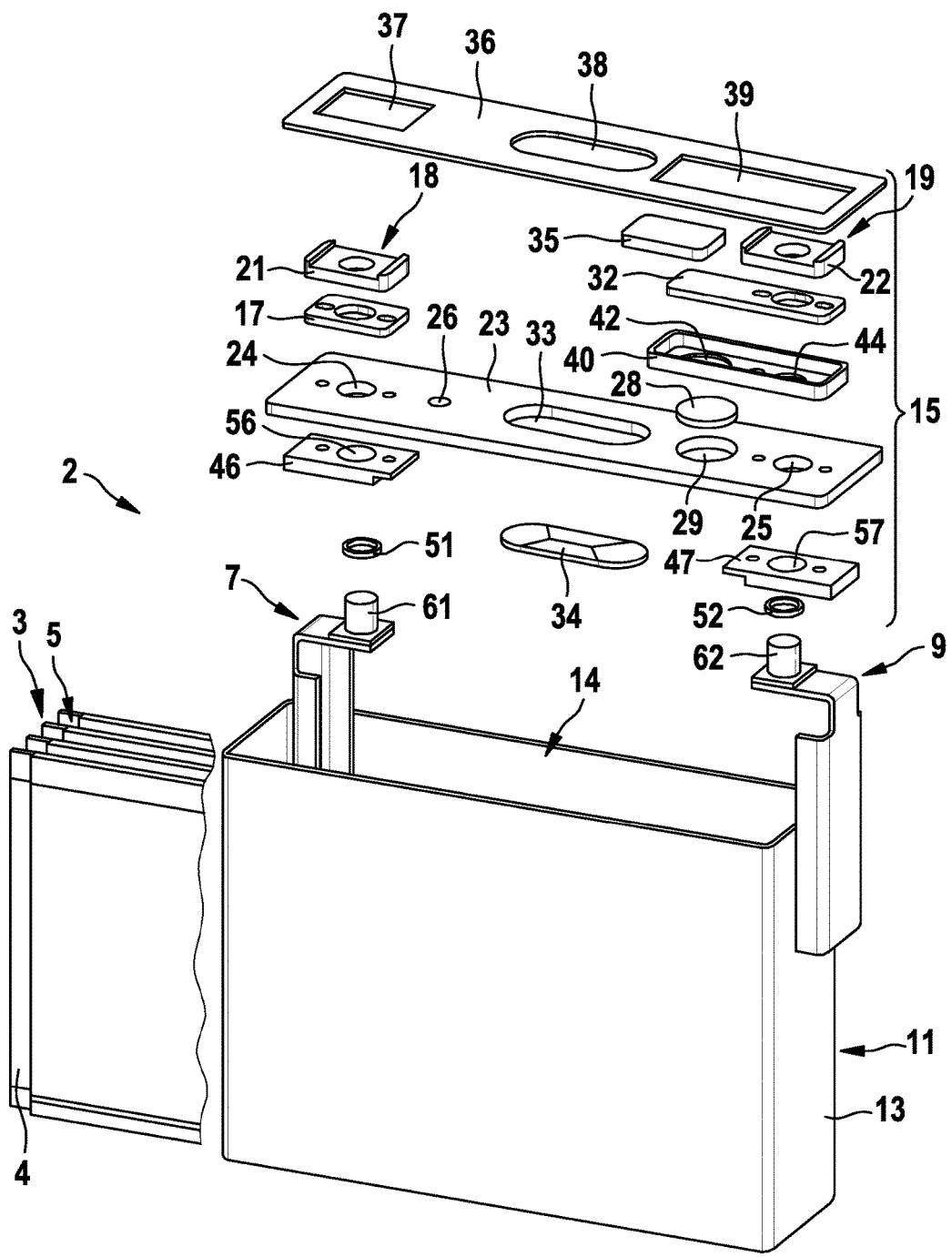
FIG. 1: shows an exploded view of a battery.

A battery cell 2 depicted in FIG. 1 comprises a cell housing 11, which is designed prismatically, in the present example cubically. The cell housing 11 is designed electrically conductive in the present example and is, for example, made from aluminum. The cell housing 11 comprises a cuboid container 13, which has a container opening 14 on one side. The container opening 14 is closed off by means of a cover assembly which comprises inter alia a cover plate 23. The cuboid container 13 and the cover plate 23 of the cell housing are in each case designed electrically conductive and are, for example made from aluminum.

The battery cell 2 comprises a negative terminal 21 and a positive terminal 22. A voltage provided by the battery cell can be tapped via the terminals 21, 22. Furthermore, the battery cell 2 can also be charged via the terminals 21, 22. The terminals 21, 22 are disposed so as to be spaced apart from one another on the cover plate 23 of the prismatic cell housing 11.

An electrode winding 3 is arranged within the cell housing 11 of the battery cell 2, which has two electrodes, namely an anode 5 and a cathode, which is not visible in this depiction. The anode 5 and the cathode are in each case designed foil-like and wound with the interposition of a separator, which is not visible in this depiction, to form the electrode winding 3. The separator is designed in an electrically insulating manner, but is ionically conductive, i.e. is conducting for lithium ions.

The anode 5 comprises an anodic active material, which is embodied in a foil-like manner. The anodic active material has silicon or an alloy containing silicon as base material. The anode 5 further comprises a current conductor 4 which is likewise embodied in a foil-like manner. The anodic active material and the current conductor 4 of the anode 5 are laid flat on one another and are connected to each other. The current conductor 4 of the anode 5 is designed to be electrically conductive and is made from a metal, for example from copper. The current conductor 4 of the anode 5 projects on a first narrow side over an edge of the electrode winding 3 and is connected to a first collector 7. The current conductor 4 of the anode 5 is connected electrically to the negative terminal 21 of the battery cell 2 via the first collector 7.

The cathode comprises a cathodic active material which is embodied in a foil-like manner. The cathodic active material has a metal oxide as base material, for example lithium cobalt oxide ($LiCoO_2$). The cathode further comprises a current conductor, which is likewise embodied in a foil-like manner. The cathodic active material and the current conductor are laid flat against one another and are connected to each other. The current conductor of the cathode is constructed to be electrically conductive and is made from a metal, for example from aluminum. The current conductor of the cathode projects on a second narrow side, which lies opposite the first narrow side, over an edge of the electrode winding 3 and is connected to a second collector 9. The current conductor of the cathode is electrically connected to the positive terminal 22 of the battery cell 2 via the second collector 9.

The first collector 7, which is located within the cell housing 11, is connected to the negative terminal 21, which is located outside of the cell housing 11, by means of as first contact arrangement 18. The second collector 9, which is located within the cell housing 11, is connected to the positive terminal 22, which is located outside of the cell housing 11, by means of a second contact arrangement 19.

The cell housing 11 of the battery cell 2 is filled with a liquid electrolyte. The electrolyte surrounds the anode 5, the cathode and the separator. The electrolyte is also ionically conductive. The electrolyte is filled into the cell housing 11 through a filling opening 26 in the cover plate 23 after the assembly of the cell housing 11. After that, the filling opening 26 is closed by means of a sealing plug that is not depicted.

The first collector 7 is connected to a first connection bolt 61, which projects away from the collector 7 on a side facing away from the electrode winding 3. The first connection bolt 31 passes through a first cover opening 24 in the cover plate 23 of the cover assembly 15 and is connected to the negative terminal 21 at the end thereof facing away from the first collector 7.

The second collector 9 is connected to a second connection bolt 62, which projects away from the second collector 9 on a side facing away from the electrode winding 3. The second connection bolt 62 passes through a second cover opening 25 in the cover plate 23 of the cover assembly 15 and is connected to the positive terminal 22 at the end thereof facing away from the second collector 9.

In the present exemplary embodiment, the cover assembly 15 comprises a potential plate 17, which is embodied so as to be electrically conductive, and which is disposed between the cover plate 23 and the negative terminal 21. The potential plate 17 connects the cover plate 23 electrically to the negative terminal 21. Thus, the cell housing 11 lies at the same electric potential as the negative terminal 21.

The cover assembly 15 further comprises a connection plate 32, which is likewise embodied to be electrically conductive, and which is disposed between the cover plate 23 and the positive terminal 22. The connection plate 32 is connected electrically to the positive terminal 22. A connection plate insulation 35 is furthermore mounted, in the present example adhesively attached, on the side of the connection plate 32 facing away from the cover plate 23, laterally next to the positive terminal 22.

A spacing insulator 40, which insulates the cover plate 23 electrically from the connection plate 32 and the positive terminal 22, is provided between the cover plate 23 and the connection plate 32. The spacing insulator 40 has an access opening 44, through which the second connection bolt 62 projects.

The cover assembly 15 also comprises a cover plate insulation film 36, which is adhesively bonded to the side of the cover plate 23 which faces away from the container 13. The cover plate insulation film 36 has a first film opening 37, through which the negative terminal 21 and the potential plate 17 pass. The cover plate insulation film 36 also has a second film opening 38, the function of which will be discussed later. The cover plate insulation film 36 also has a third film opening 39 through which the positive terminal 22, the connection plate 32, the connection plate insulation 35 and the spacing insulator 40 pass.

A first connection insulator 46 is provided between the cover plate 23 and the first collector 7, said insulator insulating the cover plate 23 electrically from the first collector 7. The first connection insulator 46 has a first insulator opening 56, through which the first connection bolt 61 extends. A second connection insulator 47 is provided between the cover plate 23 and the second collector 9, which insulates the cover plate 23 electrically from the second collector 9. The second connection insulator 47 has a second insulator opening 57, through which the second connection bolt 62 extends.

A first sealing ring 51 is disposed between the first connection bolt 61 and the cover plate 23. The first sealing ring 51 is thereby placed around the first connection bolt 61 and is located in the first cover opening 24 of the cover plate 23. The first sealing ring 51 insulates the first connection bolt 61 electrically from the cover plate 23. In addition, the first sealing ring 51 seals the first cover opening 24 in an air-tight and fluid-tight manner. Thus, particularly a penetration of moisture through the first cover opening 24 into the cell housing 11 as well as an escape of electrolyte through the first cover opening 24 out of the cell housing 11 is prevented.

A second sealing ring 52 is disposed between the second connection bolt 62 and the cover plate 23. The second sealing ring 52 is thereby placed around the second connection bolt 62 and is located in the second cover opening 25 of the cover plate 23. The second sealing ring 52 insulates the second connection bolt 62 electrically from the cover plate 23. In addition, the second sealing ring 52 seals the second cover opening 25 in an air-tight and fluid-tight manner. Thus, particularly a penetration of moisture through the second cover opening 25 into the cell housing 11 as well as an escape of electrolyte through the second cover opening 25 out of the cell housing 11 is prevented.

The cover plate 23 of the cell housing 11 further comprises a bursting opening 33, which is closed by a bursting disc 34. In the event of excess pressure within the cell housing 11, the bursting disc 34 opens whereby the excess pressure can escape to the outside through the bursting opening 33. As a result, a bursting of the cell housing 11 is prevented. The bursting opening 33 in the cover plate 23 is then flush with the second film opening 38 in the cover plate insulation film 36.

In the present exemplary embodiment, the battery cell 2 also has an over charge safety device (OSD). The over charge safety device comprises an OSD opening 29, which is closed by an OSD membrane 28, provided in the cover plate 23 of the cell housing 11. The OSD membrane 28 is embodied as thin metal foil. In the event of excess pressure within the cell housing 11, which can occur by means of a temperature increase as a result of an overcharge of the battery cell, the OSD membrane 28 deforms and thereby touches the connection plate 32. To this end, the spacing insulator 40 has a short circuit opening 42 through which the OSD membrane can extend in the case of a deformation. As a result, a short circuit develops between the cell housing 11 and the second collector 9, whereby a charging process of the battery cell 2 is interrupted.

Figure 2:
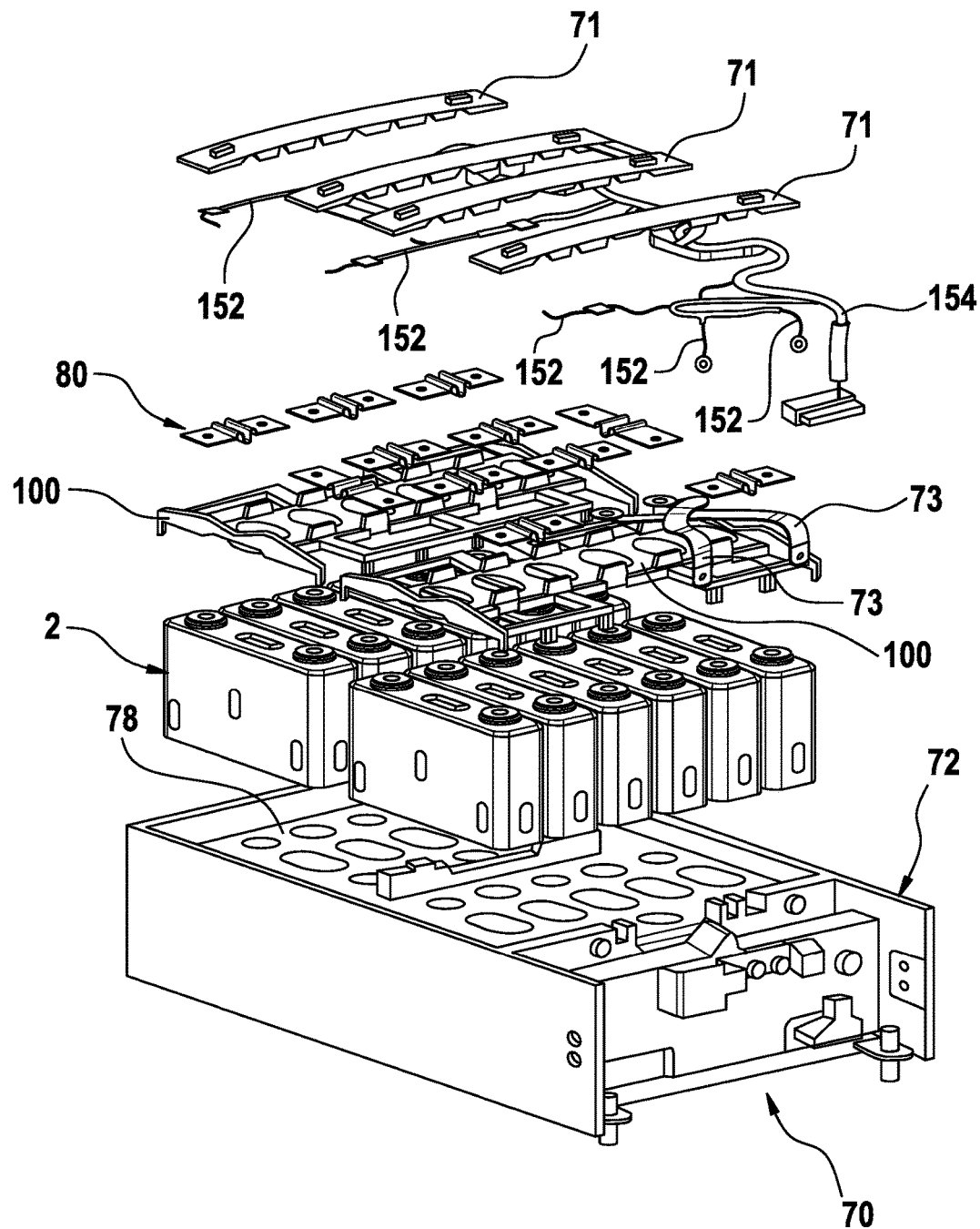
FIG. 2: shows an exploded view of a battery submodule.

In FIG. 2, an exploded view of a battery submodule 70 is shown. The battery submodule 70 comprises as plurality, here twelve, battery cells 2 which are disposed within a submodule box 72. After the insertion of the battery cells 2 into the submodule box 72, said box is filled with a casting compound 78, which subsequently surrounds the battery cells 2.

The terminals 21, 22 of the battery cells 2 are connected electrically to one another by means of cell connectors 80. Busbars 73, which are connected to the negative terminal 21 of one battery cell 2 and to the positive terminal 22 of another battery cell 2, are used in order to electrically connect the battery submodule 70.

The battery cells 2 are fixed in the submodule box 72 of the battery submodule 70 by means of two holding-down means 100. Coverings 71 rest on the holding-down means 100. A cable harness 154 is laid between the coverings 71 and the holding-down means 100. The cable harness 154 comprises individual cables 152, which are connected to the cell connector 80.

Figure 3:
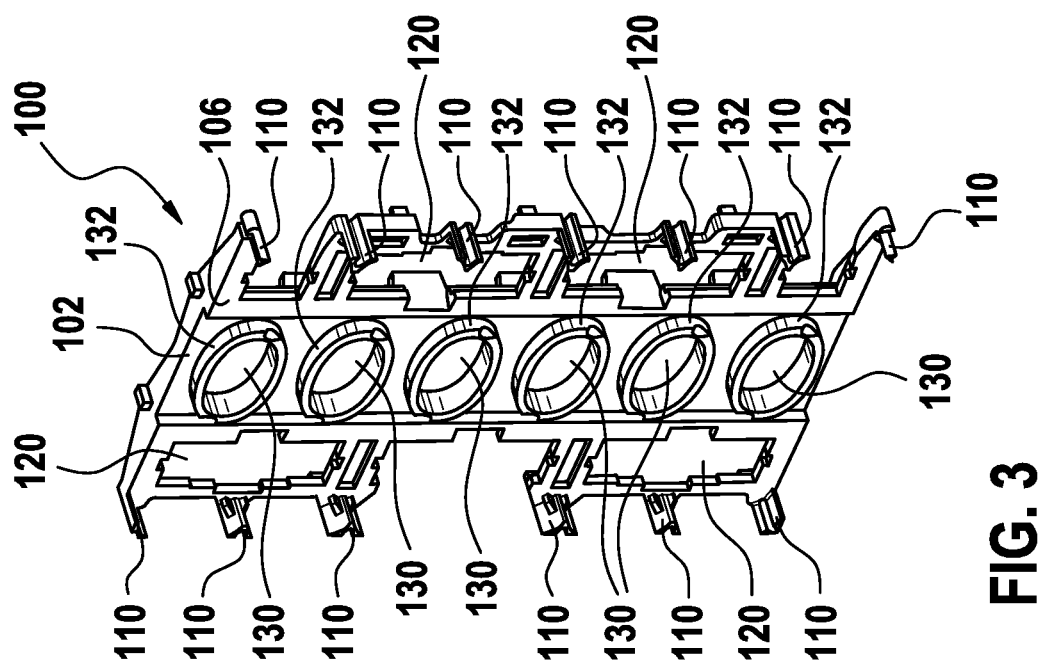
FIG. 3: shows a perspective depiction of a holding-down means from the bottom side thereof.

In FIG. 3, a perspective depiction of a holding-down means 100 is shown from the bottom side 106 thereof. The holding-down means 100 comprises positioning elements 110 for positioning the holding-down means 100 relative to the battery cells 2. The holding-down means 100 further comprises guide elements 120 for guiding the cell connectors 80. The guide elements 120 are designed in this case as guide openings which pass continuously from the bottom side to an opposing top side.

Gas-venting openings which pass through from the bottom side to the top side are provided in a central region 102. Sealing elements 132 are fitted on the bottom side, which surround the gas-venting openings 130.

Figure 4:
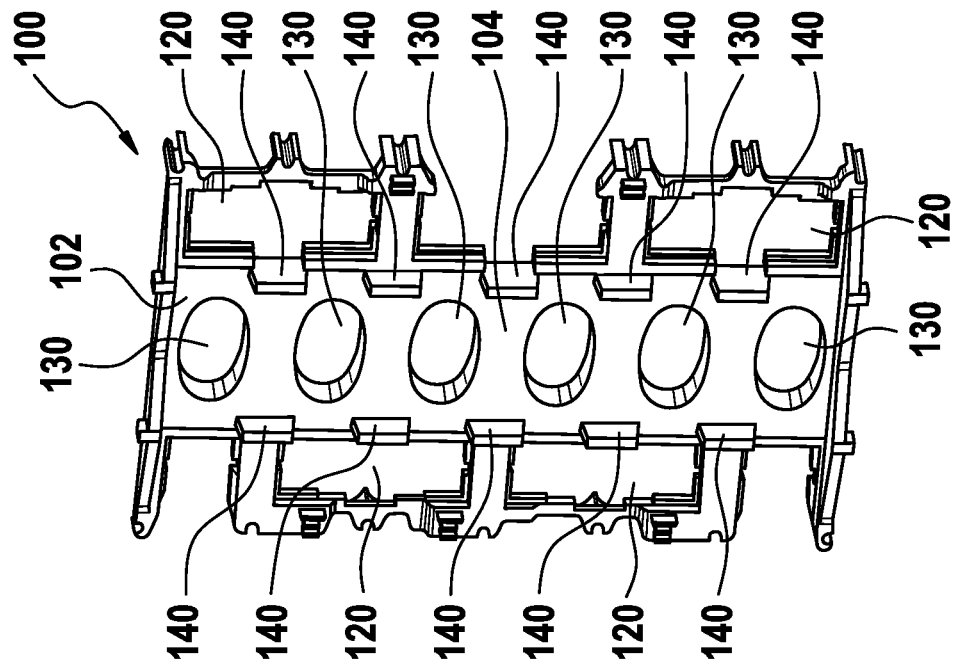
FIG. 4: shows a perspective depiction of the holding-down means from FIG. 3 from the top side thereof.

In FIG. 4, a perspective depiction of the holding-down means 100 from FIG. 3 is shown from the top side 104 thereof. Tolerance compensation elements 140 are arranged on the top side 104. The tolerance compensation elements 140 are designed to be flexible and compressible and project approximately at right angles from the top side 104 of the holding-down means 100.

Figure 5:
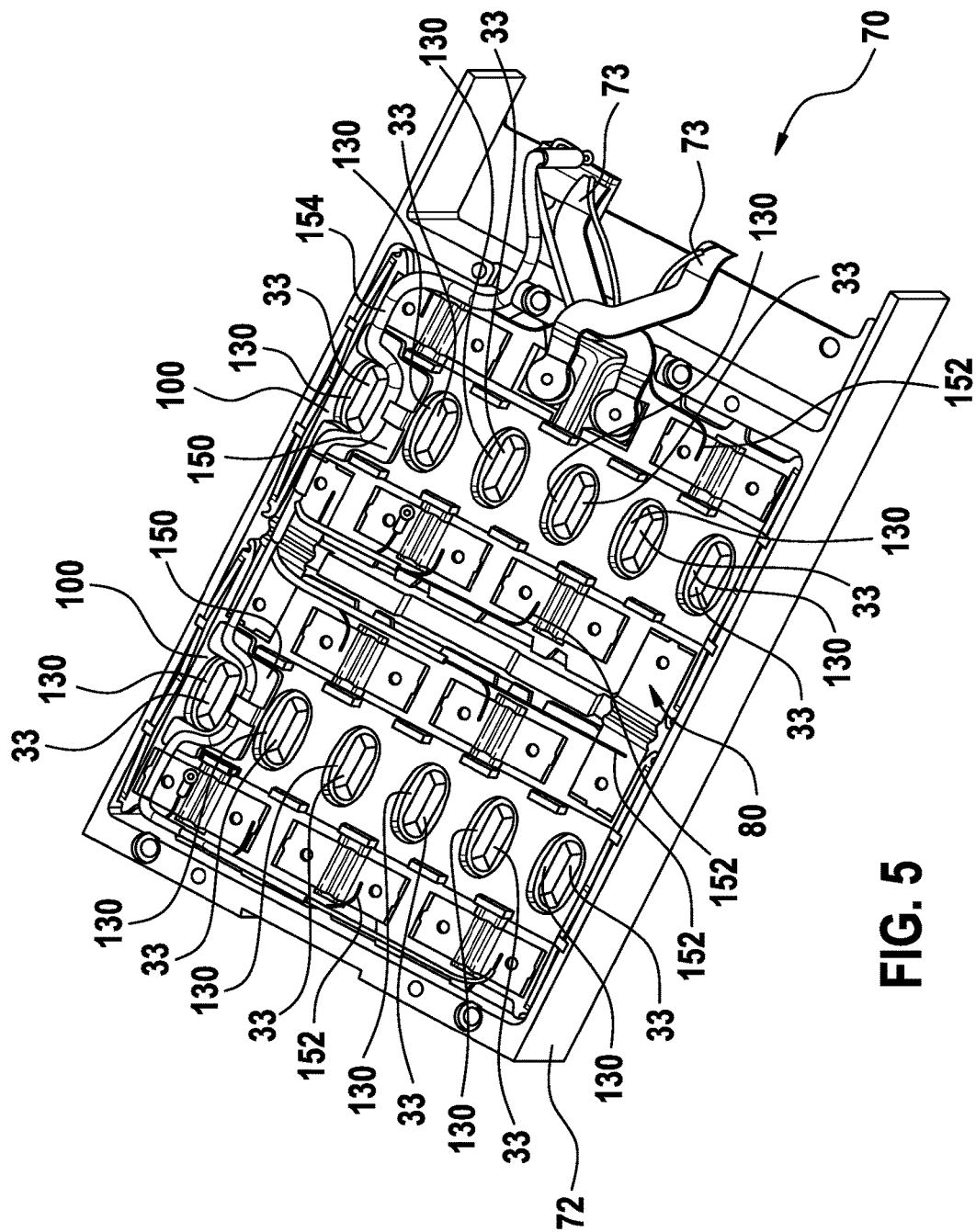
FIG. 5: shows a perspective depiction of a battery submodule.

An assembled battery submodule 70 is perspectively depicted in FIG. 5. The battery submodule 70 comprises the components already shown and described in FIG. 2, wherein the coverings 71 are not depicted.

The two holding-down means are set on the battery cells 2 in such a way that the gas-venting openings 130 surround the bursting openings 33. The sealing elements 132, which are not visible here, rest on the cover plates 23 of the battery cells.

A cable 152 is connected to each cell connector 80. The cables 152 are put together to form the cable harness 154, and the cable harness is led out of the submodule box 72. Cable guides 150 are fitted to the holding-down means 100, said cable guides being used to guide the cables 152 as well as the cable harness 154.

Figure 6:
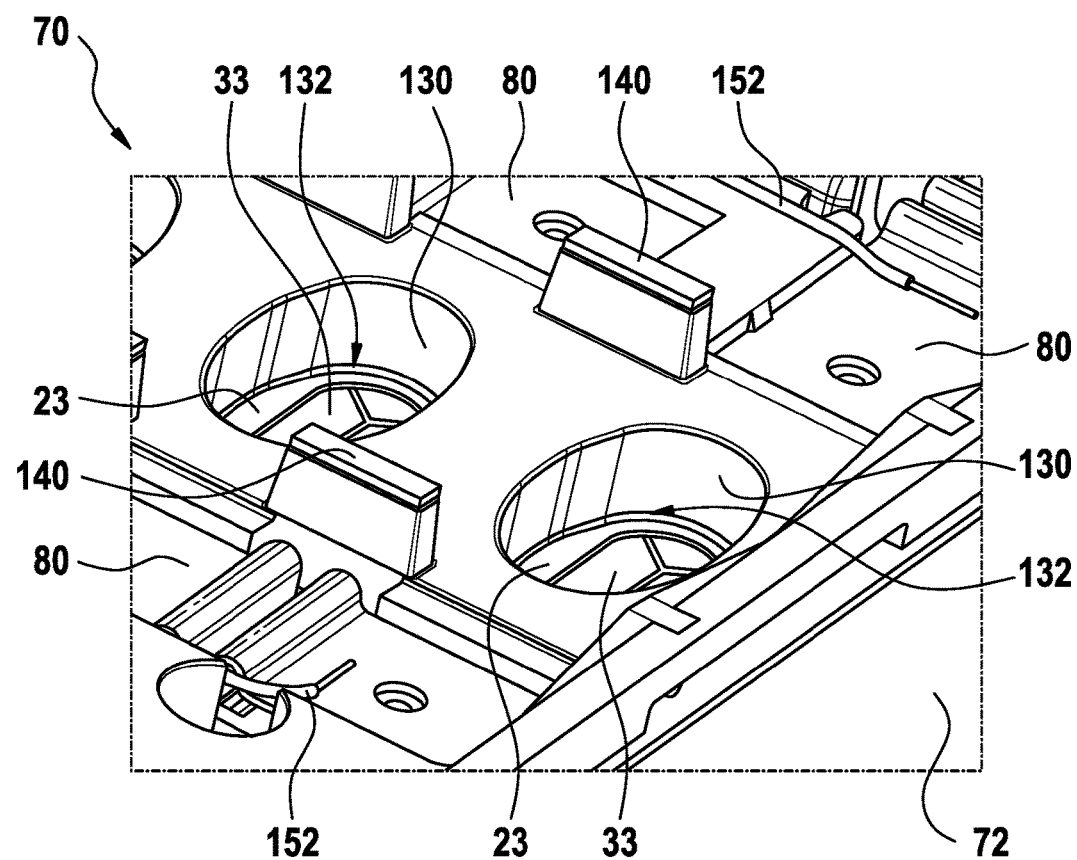
FIG. 6: shows an enlarged depiction of a portion of the battery submodule from FIG. 5.

A portion of the battery submodule 70 from FIG. 5 is shown in an enlarged depiction in FIG. 6. The gas-venting openings 130 of the holding-down means 100 shown surround the bursting openings 33 of the battery cells 2 lying thereunder. The sealing elements 132 rest on the cover plates 23 of the battery cells. When casting the battery cells 2 within the submodule box 72 with the casting compound 78, the sealing elements 132 prevent the sealing compound 78 from wetting and closing the bursting openings 33 of the battery cells.

Figure 7:
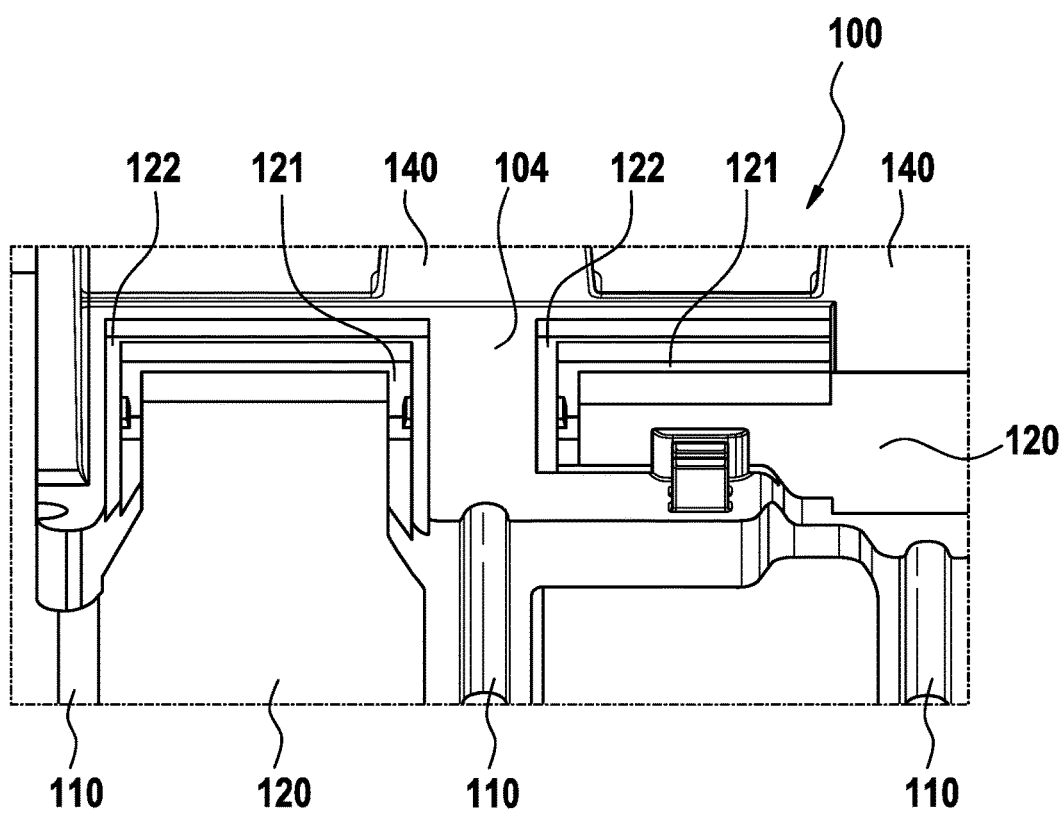
FIG. 7: shows an enlarged depiction of a portion of a holding-down means according to a modification

In FIG. 7, an enlarged depiction of a portion of a holding-down means 100 is shown according to a modification. The guide elements 120 designed as guide openings thereby comprise in each case a first step 121, which is used to support the cell connectors 80. The guide elements 120 each further comprise a second step 122, which is disposed between the first step 121 and the top side 104.

Figure 8:
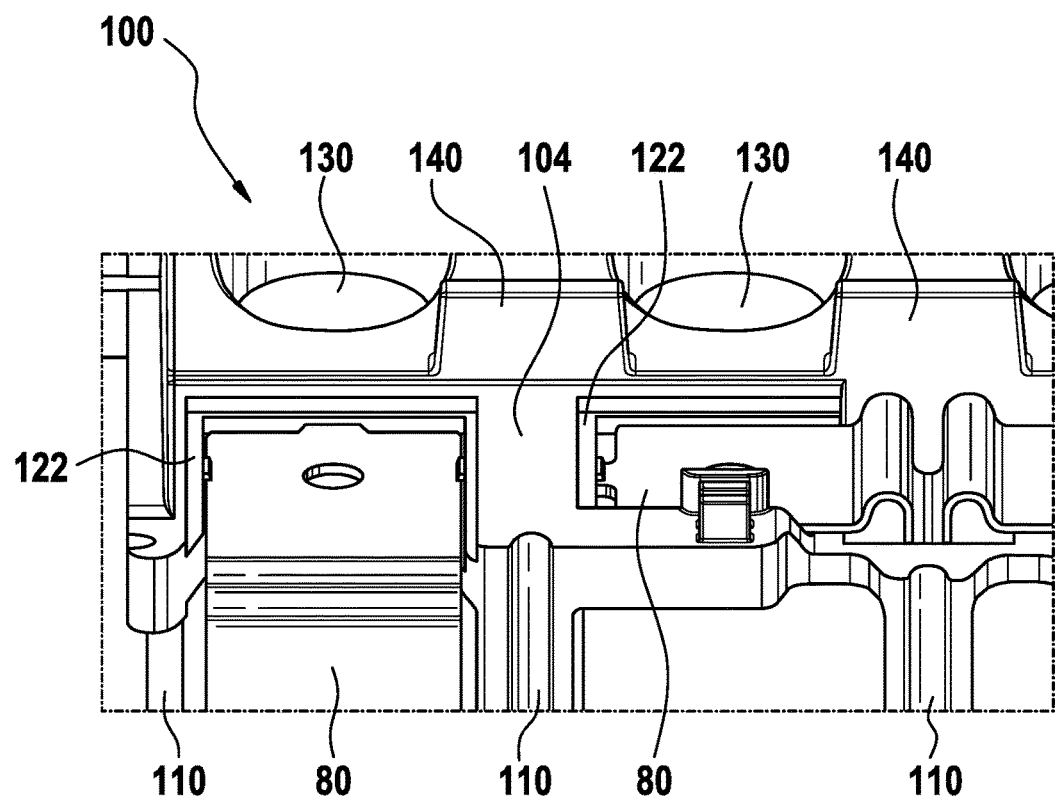
FIG. 8: shows an enlarged depiction of a portion of the holding-down means according to the modification from FIG. 7 with cell connectors.

In FIG. 8, an enlarged depiction of the portion of the holding-down means 100 according to the modification from FIG. 7 is depicted with cell connectors 80. The cell connectors 80 lie in each case on the first step 121 of the guide elements 120. The first steps 121 are covered by the cell connectors 80. The cell connectors 80 thus engage in the guide elements 120 of the holding-down means 100.

The invention is not limited to the exemplary embodiments described here and to the aspects emphasized therein. A multiplicity of modifications, which lie within the scope of the action of the person skilled in the art, is instead possible within the ranges specified by the claims.

What is claimed is:

1. A holding-down apparatus (100) for fixing battery cells (2) in a battery submodule (70), comprising:
    positioning elements (110) for positioning the holding-down apparatus (100) relative to the battery cells (2),
    guide elements (120) for guiding cell connectors (80) which connect the battery cells (2),
    gas-venting openings (130) which pass through from a top side (104) to a bottom side (106) in a central region (102) of the holding-down apparatus (100), and
    sealing elements (132) positioned on the bottom side of the holding-down apparatus, each sealing element being a ring surrounding a respective gas-venting opening (130).

2. The holding-down apparatus (100) according to claim 1, further comprising tolerance compensation elements (140) on the top side (104) of the holding-down apparatus (100).

3. The holding-down apparatus (100) according to claim 1, further comprising cable guides (150) for guiding electric cables (152).

4. The holding-down apparatus (100) according to claim 1, characterized in that the guide elements (120) are configured as guide openings which pass through from the top side (104) to the bottom side (106).

5. The holding-down apparatus (100) according to claim 1, characterized in that the guide elements (120) comprise a first step (121) for supporting the cell connectors (80) and a second step (122).

6. A battery submodule (70), comprising a plurality of battery cells (2), cell connectors (80) which connect the battery cells (2) and at least one holding-down apparatus (100) for fixing the battery cells (2), the holding-down apparatus comprising:
    positioning elements (110) for positioning the holding-down apparatus (100) relative to the battery cells (2),
    guide elements (120) for guiding cell connectors (80) which connect the battery cells (2),
    gas-venting openings (130) which pass through from a top side (104) to a bottom side (106) in a central region (102) of the holding-down apparatus (100), and
    sealing elements (132) positioned on the bottom side of the holding-down apparatus, wherein each sealing element is a ring surrounding a respective gas venting opening and engaging a cover plate of one of the battery cells.

7. The battery submodule (70) according to claim 6, characterized in that the battery cells (2) have bursting openings (33), which are surrounded by the sealing elements (132) of the holding-down apparatus (100).

8. The battery submodule (70) according to claim 6, characterized in that the cell connectors (80) engage in the guide elements (120) of the holding-down apparatus (100).

9. A vehicle comprising a battery submodule (70) according to claim 6, wherein the vehicle is an electric vehicle (EV), a hybrid vehicle (HEV), or a plug-in hybrid vehicle (PHEV).

10. The battery submodule according to claim 6, further comprising tolerance compensation elements (140) on the top side (104) of the holding-down apparatus (100).

11. The battery submodule according to claim 6, further comprising cable guides (150) for guiding electric cables (152).

12. The battery submodule according to claim 6, characterized in that the guide elements (120) are configured as guide openings which pass through from the top side (104) to the bottom side (106).

13. The battery submodule according to claim 6, characterized in that the guide elements (120) comprise a first step (121) for supporting the cell connectors (80) and a second step (122).

14. The holding-down apparatus (100) according to claim 1, characterized in that the sealing elements (132) of the holding-down apparatus (100) rest on the battery cells (2).

15. The holding-down apparatus (100) according to claim 14, characterized in that the battery cells (2) have bursting openings (33), each of which are surrounded by the sealing elements (132) of the holding-down apparatus (100).

16. The holding-down apparatus (100) according to claim 1, characterized in that the cell connectors (80) engage in the guide elements (120) of the holding-down apparatus (100).

* * * * *